United States Patent [19]
Heidacker

[11] 3,892,214
[45] July 1, 1975

[54] CAST-IN E.F.E. HOT PLATE

[75] Inventor: Walter C. Heidacker, Bloomfield Hills, Mich.

[73] Assignee: General Motors Corporation, Detroit, Mich.

[22] Filed: Oct. 29, 1973

[21] Appl. No.: 410,767

[52] U.S. Cl.............. 123/122 AC; 123/52 MV; 123/122 AB; 165/52
[51] Int. Cl............................................. F02m 31/00
[58] Field of Search. 123/52 MV, 122 AC, 122 AB; 165/52

[56] References Cited
UNITED STATES PATENTS

| | | | |
|---|---|---|---|
| 1,990,662 | 2/1935 | Moore | 123/122 AC |
| 3,717,130 | 2/1973 | Thornburgh | 123/122 AB |
| 3,717,131 | 2/1973 | Chana | 123/122 AB |
| 3,780,715 | 12/1973 | Flitz | 123/122 AB |

Primary Examiner—Manuel Antonakas
Assistant Examiner—R. H. Lazarus
Attorney, Agent, or Firm—J. C. Evans

[57] ABSTRACT

A quick heat manifold assembly for evaporating fuel particles from a carburetor under cold engine start conditions includes an integrally cast manifold having a first portion defining riser bores and induction passages and a second portion thereon defining an exhaust heat crossover passage with opposite inlets thereon adapted to be connected to the exhaust manifold of a vehicle to receive exhaust heat therefrom. The cast manifold includes an induction passage floor having depressions therein underlying each riser bore for locating a cup-shaped fuel evaporation plate in the floor of the induction passage. The plate includes a peripheral edge thereon cast in place in the floor of the induction passage to form a sealed joint between the induction passage and the exhaust crossover passage to prevent exhaust bypass into the induction passage. The second casting portion includes inwardly deformed segments thereon located in close proximity to a predetermined portion of the length of the evaporation plate for exhaust flow restriction and includes casting segments on each side of the inwardly deformed segment to reinforce the cast manifold at the cast in place flange to maintain the integrity of the sealed joint defined thereat.

2 Claims, 4 Drawing Figures 692,214

CAST-IN E.F.E. HOT PLATE

This invention relates to quick heat manifolds for evaporating fuel particles from a carburetor assembly during cold engine starts and more particularly to engine manifolds having a plate assembly located below vertical riser bores to intercept fuel particles during cold engine starts and including means for directing engine exhaust flow across the plate assembly for rapidly increasing the temperature thereof following cold engine start to evaporate fuel particles collected on the plate.

Quick heat manifolds for evaporating fuel particles in the air-fuel mixture directed into the engine under cold start conditions include a thin plate hot spot between the intake manifold and an exhaust heat crossover passage to collect the fuel particles and to be heated by the exhaust crossover flow so as to quickly evaporate the fuel particles during cold start engine operation.

In such assemblies, it is necessary to include a positive seal between the induction passage of the intake manifold and the exhaust crossover passageway to prevent the bypass of exhaust gases into the induction passage.

It is desirable to cast the exhaust heated thin plate into a cast iron intake manifold at the foundry.

Accordingly, one object of the present invention is to include an improved thermally conductive hot plate between the induction passage of a cast intake manifold and an exhaust crossover passage therein by the provision of a plate that is cast in situ in the casting so as to provide a positive seal between the induction passage and the exhaust crossover passage to prevent exhaust bypass into the induction passage.

Yet another object of the present invention is to include an improved thin plate exhaust heated hot spot in a cast intake manifold including a peripheral flange on the plate cast in situ in a depression within an induction passage floor, the intake manifold including an integral casting portion thereon formed to define an exhaust crossover passage having a restricted depth in the vicinity of the thin plate and including means thereon for reinforcing the casting at the cast in place flange to maintain a positive seal between the induction passage and the crossover passage.

Another object of the present invention is to provide a design with a stainless steel plate stamping cast in place integrally within a cast iron manifold to provide a positive sealed joint between the induction passage of the manifold and an exhaust heat crossover passage therein; the stamped steel, exhaust heated hot spot plate, being clamped between a heater core and an induction passage core portion of the cast iron manifold includes a heater core cross section that maintains a substantial strength in the casting to prevent breakage of the heater core and to reinforce the cast in place sealed joint between plate and casting. Further objects and advantages of the present invention will be apparent from the following description, reference being had to the accompanying drawings wherein a preferred embodiment of the present invention is clearly shown.

Figure 1:
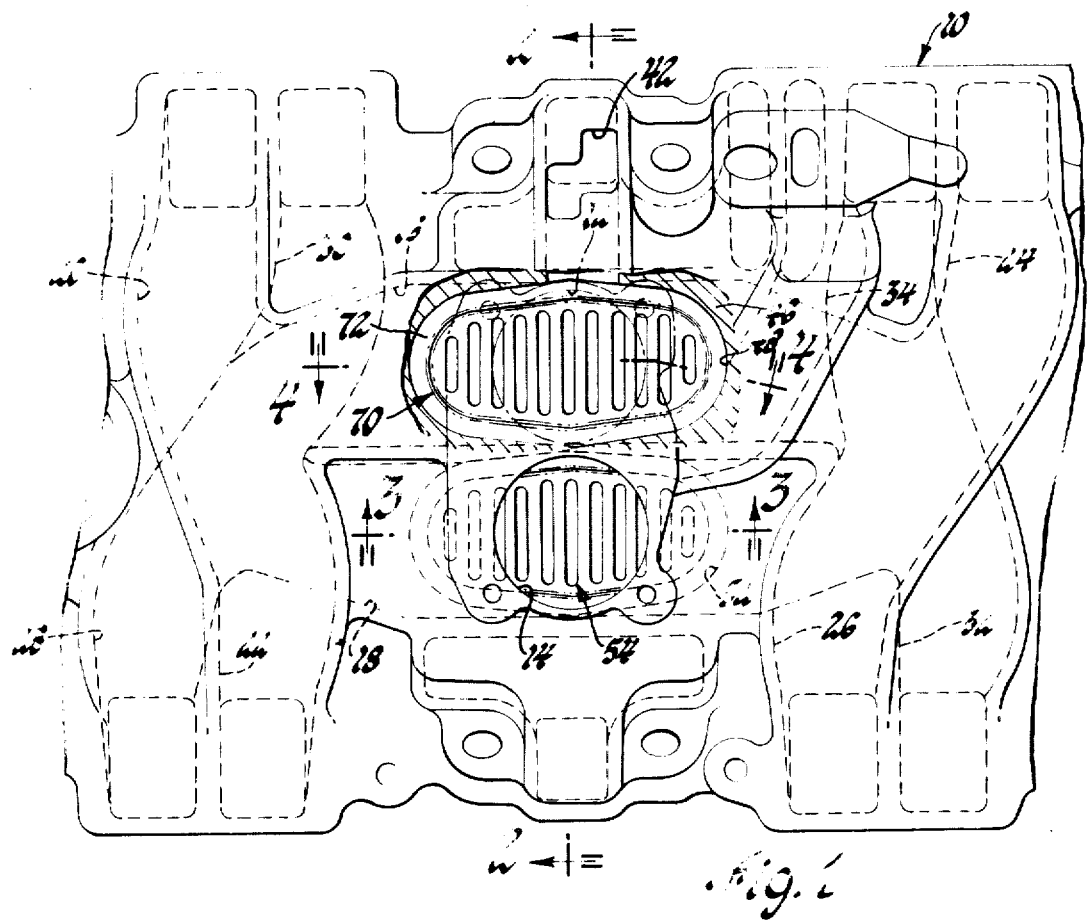
FIG. 1 is a top elevational view of a manifold casting including the present invention.

Referring now to the drawings, in FIG. 1 a cast iron intake manifold 10 is illustrated having an upper portion pair of vertical riser bores 12 and 14. The riser bore 12 opens to an upper horizontal induction plenum 16 and the riser bore 14 opens to a lower horizontal induction passage 18. The upper horizontal plenum 16 is connected forwardly (leftwardly as viewed in FIG. 1) to a pair of transverse runners 20, 22 and is connected rearwardly to another pair of transverse runners 24, 26. Similarly, the lower horizontal plenum 18 is connected forwardly to a pair of transverse runners 28, 30 and rearwardly to another pair of transverse runners 32, 34.

On the underside of the manifold 10 a second portion 36 of the casting 10 includes an exhaust crossover passage 38 therein which extends transversely of portion 36 beneath the plenums 16 and 18 to receive a portion of the exhaust gas discharged from the engine combustion chambers.

More particularly, the exhaust crossover passage 38 includes an inlet 40 on one end thereof and an inlet 42 on the opposite end thereof. Depending upon whether four cylinder exhaust heat or eight cylinder exhaust heat is utilized for flow through the exhaust crossover passage 38, means may be provided to either block exhaust flow from one bank of the engine cylinders so as to direct exhaust through the crossover inlet 40 through the crossover passage 38 thence through the inlet 42 where the exhaust heat is discharged through the exhaust system of the vehicle.

On other systems where eight cylinder exhaust heat is desired, the inlets 40, 42 can be connected so as to direct the full eight cylinder exhaust through the crossover passageway 38 for purposes of producing a more rapid increase in temperature in the heated manifold.

Figure 2:
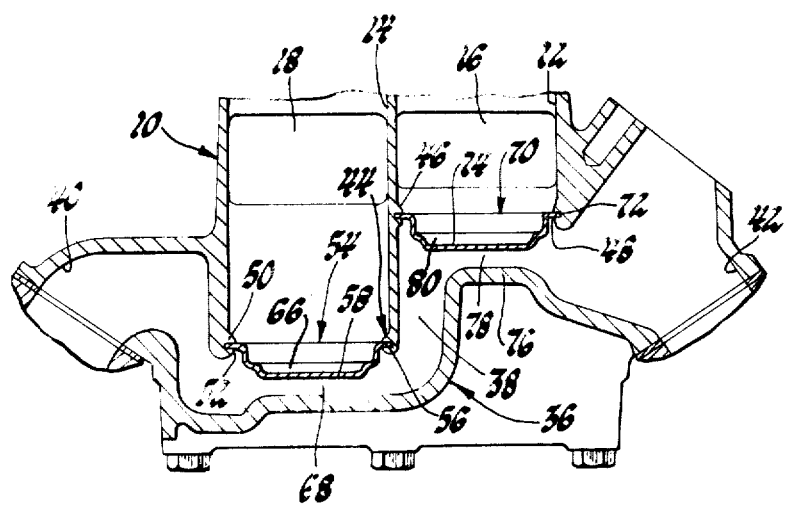
FIG. 2 is a vertical cross sectional view taken along the line 2—2 of FIG. 1.

As is best illustrated in FIG. 2, the manifold 10 includes an induction passage floor 44 located below each of the riser bores 12, 14. The floor includes an upper portion 46 having a depressed opening 48 therein of a generally oval configuration. The oval opening 48 directly underlies plenum 16 and directly overlies the crossover passage 38.

Likewise, the floor includes a lower portion 50 having a depressed opening 52 therein that directly underlies plenum 18 and directly overlies the crossover passage 38.

Figure 3:
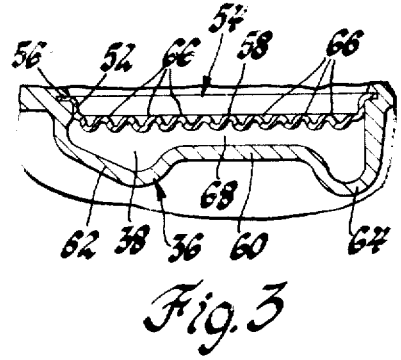
FIG. 3 is a vertical cross sectional view taken along the line 3—3 of FIG. 1.

A stainless steel cup-shaped heat transfer plate 54 is located in the depressed opening 52. More particularly, the cup-shaped plate 54 includes a continuously formed peripheral flange 56 thereon that is cast in place in the floor of the induction passage around the depressed opening 52 therein. The cup-shaped plate 54 includes a bottom surface 58 thereon that is formed inwardly of the crossover passage 38 to be spaced in close spaced relationship with an inwardly deformed segment 60 of the casting portion 36. The inwardly deformed segment 60, as best seen in FIG. 3, is integrally formed with convolutions 62, 64 on either side thereof with the convolutions being formed at a greater vertical depth with respect to the bottom surface 58 of the plate 54 than the segment 60 of the casting portion 36. The convolutions 62, 64 serve to reinforce the casting portion 36 in the vicinity of the oval shaped opening 52 therein so as to strengthen the sealed joint defined by the cast in place flange 56 on the heat transfer plate 54 to maintain a positive sealed relationship between the induction plenum 18 and the crossover passage 38 during engine operation.

As is best seen in FIG. 3, the surface 58 includes a plurality of corrugations 66 therein. A restricted passage 68 between the segment 60 and the corrugations 66 will produce a good heat transfer relationship between exhaust flow through the crossover passage 38 and the plate 54 thereby to quickly increase the temperature of the plate so as to effectively evaporate fuel droplets accumulated thereon from the overlying riser bore 14 during cold start engine conditions. By virtue of the aforedescribed arrangement, exhaust heat is concentrated against the plate 54 immediately underlying bore 14 to produce a temperature gradient along the length thereof which is highest where fuel droplets are initially collected on the plate.

The depression defining the oval opening 48 in the upper horizontal induction plenum 16 also has a stainless steel cup-shaped heat transfer plate 70 located therein with a continuously formed peripheral flange 72 thereof cast in place in the floor of the manifold 10 so as to close the oval opening 48 therein.

The plate 70 includes a lower surface 74 thereon formed inwardly of the crossover passage located in close spaced relationship to an inwardly deformed segment 76 of the casting portion 36 to define a restricted flow passage 78 therebetween which cooperates with corrugations 80 in the lower surface 74 to produce a rapid heat transfer from the exhaust flow through crossover passage 38 to the plate 70 to increase the temperature thereof to efficiently evaporate fuel particles collected during cold engine starts from the riser bore 12 immediately overlying the upper horizontal plenum 16.

Figure 4:
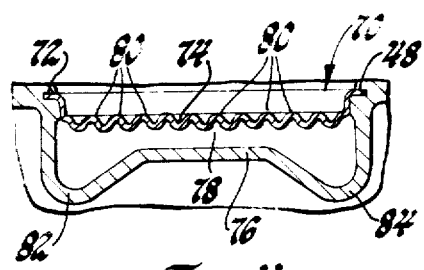
FIG. 4 is a vertical cross sectional view taken along the line 4—4 of FIG. 1.

As shown in FIG. 4, the segment 76 is integrally formed with casting convolutions 82, 84 on either side thereof formed at a greater depth with respect to plate 70 than segment 76. They serve to reinforce the casting section portion 36 at the oval opening therein so as to maintain the integrity of the sealed joint defined by the continuously formed flange 72 and the floor portion 46 of the casting thereat.

As is best seen in FIG. 1 the corrugations 66, 80 formed in the plates 54, 70 are formed transversely to the longitudinal axis of the plates and serve to form a plurality of depressions in which fuel droplets will collect during cold engine starts across the length of the plates 54, 70. The plates are depressed from the flange portions 56, 72 thereon to form a cavity for the collection of fuel in the floor 44 of the intake manifold 10. The cavity has heat concentrated thereagainst by restricted passages 68, 78 immediately below bores 12, 14. Evaporation therefrom during engine start operation will cause the fuel droplets to pass in a gaseous form to either side of the upper and lower induction plenums 16, 18 into the aforedescribed transverse runners.

While the embodiments of the present invention, as herein disclosed, constitute a preferred embodiment, it is to be understood that other forms might be adopted.

What is claimed is:

1. An engine manifold construction comprising: a first induction manifold casting portion having riser bores therein for receiving an air-fuel mixture from a carburetor, means forming an induction plenum in said first manifold casting portion located below said riser bores, means defining transverse runners in said induction manifold portion in communication with said induction plenum, a second intake manifold casting portion formed integrally with said first portion and having means forming an exhaust heat crossover passage therethrough with openings at opposite ends thereof in communication with exhaust manifolds of the vehicle, said second portion including a pair of spaced segments thereon deformed inwardly of the crossover passageway and underlying each of said riser bores, said first intake manifold casting portion including a floor therein having a pair of spaced apart oval shaped depressions therein, a cup-shaped thermally conductive fuel evaporation plate located within each of said oval shaped openings including a continuously formed oval shaped peripheral flange thereon cast in place within said floor to provide a sealed joint between the induction plenum and the crossover passage, said inwardly formed segments forming a restricted passage under each of said plates to concentrate exhaust heat against said plates at a point directly underlying said riser bores, said second casting portion including convolutions formed therein on either side of said inwardly deformed segments thereon to reinforce the cast in place flange and to reduce impingement of exhaust heat at the flange thereby to maintain a positive seal joint therebetween during engine operation.

2. In a quick heat manifold assembly, the combination of a first manifold casting portion having a vertical riser bore therein and an induction passage with a horizontal floor underlying said riser bore, means forming a depressed opening in said horizontal floor underlying said riser bore, a second casting portion integrally formed with said induction passage floor including an exhaust heat crossover passage therein with an opening at each end adapted to be connected to exhaust manifolds of the engine to receive exhaust heat flow therefrom, said second casting portion including a segment thereon spaced vertically with respect to said horizontal floor to define a reduced cross sectional flow passage in the crossover passage, a cup-shaped fuel evaporation plate of thermally conductive thin section metal located within said depression and including a continuously formed flange thereon cast in place within the floor of the first casting portion around the depression therein, said cast in place flange defining a sealed joint between the induction plenum and the crossover passage to prevent exhaust bypass therebetween, said fuel evaporation plate including a bottom surface thereon directly underlying said riser bores for intercepting fuel particles therefrom, said floor portion being arranged in close spaced parallelism with said segment to define a restricted flow path for exhaust flow through said crossover passage to concentrate exhaust heat at a point immediately underlying said riser bore to produce a quick heat up of said cup-shaped plate following cold engine start up for purposes of quickly evaporating accumulated fuel particles on the plate for flow from the induction plenum into the engine, said inwardly deformed segment having a width less than that of said floor depression to produce exhaust heat concentration in said plate and said second casting portion including convolutions formed therein on either side of said vertically spaced segment of greater vertical depth than said segment to reinforce said crossover passage at said floor depressions and to reduce impingement of exhaust heat at the flange thereby to maintain a positive seal between the periphery of said plate and said casting floor.

* * * * *